INVENTOR.
ROBERT A. FLOWER
CHARLES R. KENNY
ATTORNEY

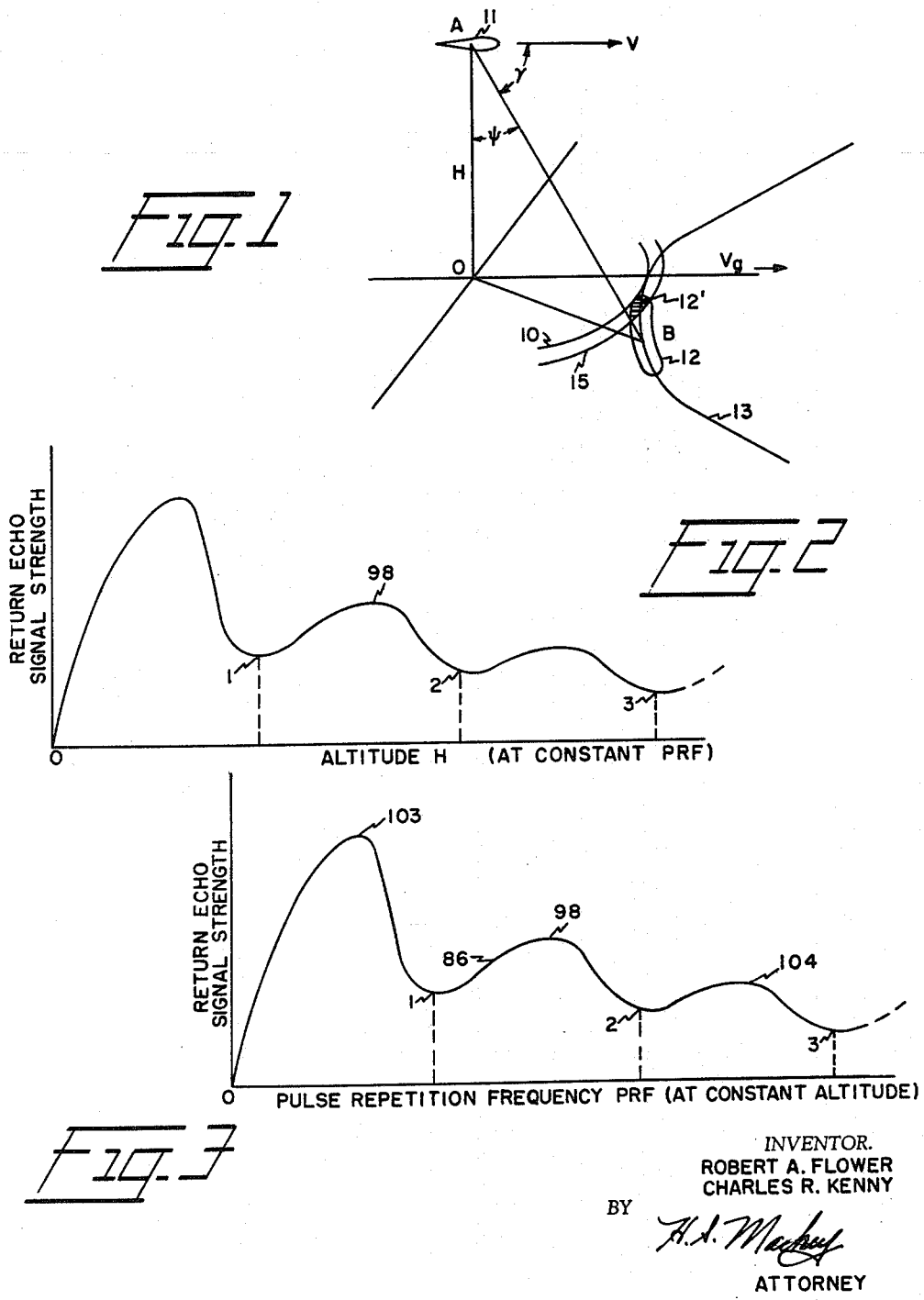

United States Patent Office 2,914,764
Patented Nov. 24, 1959

2,914,764

PULSED MICROWAVE ECHO INSTRUMENT

Robert A. Flower, White Plains, and Charles R. Kenny, Purdy's Station, N.Y., assignors to General Precision Laboratory Incorporated, a corporation of New York Application December 31, 1956, Serial No. 632,620

6 Claims. (Cl. 343—9)

This invention relates to improvements in pulsed microwave echo instruments wherein the Doppler principle is used for determining vehicle speed and the like.

When pulsed microwave apparatus is employed to produce microwave radiation echo signals to derive information from the Doppler shift, reception is ineffective at ranges at which the echo return coincides in time with the transmission of a pulse, either because the more powerful transmitted pulse masks the weak received pulse or because the receiver is gated off during the time of a transmission pulse to protect against overload. When such apparatus is airborne, altitudes at which this occurs are those at which the radiation travel time equals an integral multiple of the pulse repetition period. The reduction of signal strength at these altitudes may be said to be at "altitude holes."

Accuracy of the information secured by such apparatus, such as indication of aircraft ground track speed, is affected by altitude holes. As the aircraft rises and in rising nears a critical altitude, the error is negative and increasing, changing abruptly to positive error as the aircraft passes through this altitude. Midway between two critical altitudes the error is zero and changes only slowly. This error is termed calibration error because it is usually given in terms of the variation in the ratio between received Doppler frequency and aircraft ground speed. It may also be termed "altitude hole calibration error" or, more generally, range calibration error.

Since the altitudes at which the error reverses its sign depend on the pulse repetition period, and in fact are directly proportional thereto, the received signal strength and the calibration constant may be varied at a constant altitude by varying the pulse repetition frequency (PRF). The values of PRF at which the calibration error changes sign abruptly and at which the signal strength is at a minimum might be termed, by analogy, PRF holes.

This invention provides means for the automatic adjustment of the pulse repetition frequency to an optimum value at any altitude. Advantage is taken of the fact that the direct voltage output of an automatic gain control (AGC) circuit is a function of the input signal strength. This voltage is not only employed as an indicator of altitude hole location, but also is used to control the frequency produced by the pulse repetition frequency generator so as to adjust its output frequency to an optimum. In order to distinguish positive error from negative error, the pulse repetition frequency generator is frequency modulated.

The frequency modulation time function may be triangular, simply sinusoidal, or have other suitable waveform, including noise.

The principal purpose of this invention is to minimize or eliminate calibration error caused by altitude holes.

A further understanding of this invention may be secured from the detailed description and drawings, in which:

Figure 1 is an illustration of the geometric relations of an aircraft, its radiated microwave beam, and the earth.

Figures 2, 3 and 7 depict the relations between aircraft altitude, pulse repetition frequency and signal strength.

Figure 4:
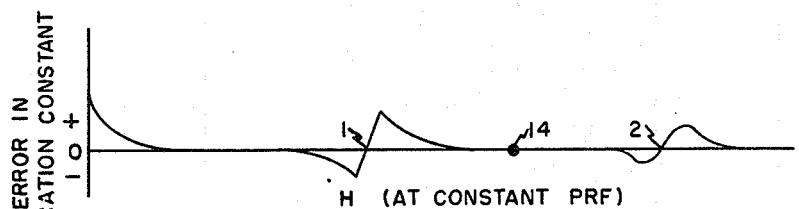
Figures 4 and 5 depict the relations between aircraft altitude, pulse repetition frequency and calibration error.

Referring now to Fig. 1, an aircraft 11 is indicated at point A in space. This aircraft has a velocity V and a ground track velocity $V_g$. The aircraft radiates a pulsed microwave beam at an angle $\gamma$ with the velocity direction, irradiating the earth in an area 12. This area lies generally along a hyperbola 13 which is the locus of beams having the same $\gamma$ angle. All echoes from this hyperbola have the same Doppler frequency difference $f_D$ relative to the transmitted microwave frequency, $f_D$ being determined by the expression $$f_D = \frac{2V}{\lambda} \cos \gamma \qquad (1)$$

in which $\lambda$ is the wavelength of the transmitted energy in free space. The area 12 has width perpendicular to hyperbola 13, therefore a Doppler spectrum rather than a pure frequency is derived from the echo.

The time elapsed between a transmitted pulse and its received echo is proportional to the length of line AB, and has the value $$T_{AB} = \frac{2AB}{c} \text{ seconds} \qquad (2)$$

in which $c$ is the speed of light. Reception of the echo coincident with a transmitted pulse causes the echo signal to be partly or wholly lost. This occurs when an integral multiple, $n$, of the pulse repetition period, T, equals $T_{AB}$, or $$T = \frac{T_{AB}}{n} = \frac{2H}{nc \cos \psi} \qquad (3)$$

in which H is the aircraft altitude and $\psi$ is the angle which the beam AB makes with the vertical direction. Thus the pulse repetition frequency, PRF, is given by $$PRF = n\frac{c}{2H} \cos \psi \qquad (4)$$

and, solving for altitude $$H = n\frac{c}{2PRF} \cos \psi \qquad (5)$$

This Equation 5 gives the equally spaced altitudes at which minimum signal occurs, PRF being constant. The several values of H are secured by assigning values of 0, 1, 2, 3, etc. to $n$.

Figure 2 presents variation of echo signal strength with altitude at constant PRF, with the minima 0, 1, 2, etc., corresponding to values of altitude given by Equation 5. The numbers 0, 1, 2, etc. represent values of $n$ in Equation 5 and are termed the orders of the altitude holes. A graph, Fig. 3, of identical form depicts the relation between PRF and signal strength at constant altitude with minima as given by Equation 4. The numbers 0, 1, 2, etc. represent the values of $n$ in this equation and might be termed the orders of the PRF holes, or minimal points of the graph.

Referring again to Fig. 1, the microwave receiver in the aircraft 11 is provided with a frequency tracker which continuously inspects the spectrum of Doppler frequencies derived from the echo from patch 12, and finds the statistical spectrum center frequency, emitting a signal representative of this frequency. This frequency tracker output frequency may be termed the average Doppler frequency, and its ratio to the aircraft ground speed is termed the calibration constant. It is actually constant for a given instrument in the absence of altitude hole effects and the similar sea return effects.

Equations 3, 4 and 5 describe the time and space relations of the microwave beam at minimum signal points and the space relations are graphically indicated in Fig. 1. In this figure the line AB indicates the microwave beam center only. Actually the beam has thickness so that it irradiates the entire patch 12 and at lower strength irradiates outside of the patch. Thus, in the plane of triangle OAB, the beam has considerable thickness. This thickness corresponds to variations of the angle $\psi$ of this triangle. As indicated by the above equations, the signal strength varies as $\cos \psi$. Thus circles of constant strength about the point O at various radii OB could be drawn. These circles would intersect the patch 12 asymmetrically. That is, at increasing radius values, circles would encroach on the patch 12 as indicated by the lines 10 and 15. Thus, when an aircraft descends and starts to enter an altitude hole region the shaded portion 12' is first affected. Since the echo return from this portion 12' is now less than from the remainder of the patch 12, the center for average spectrum frequency is now shifted to the right and down, and no longer lies on the hyperbola 13, but to its right. That is, the average Doppler frequency now is increased to that for a smaller $\gamma$ angle in accordance with Equation 1. Thus the calibration constant is affected by altitude holes. This effect is plotted against altitude in Fig. 4 and against PRF in Fig. 5, the forms being identical.

Figure 5:
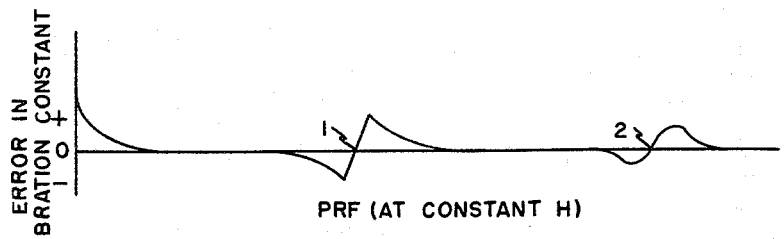

In Figs. 4 and 5 the orders of the altitude and PRF holes are indicated by the numerals 0, 1, 2, etc., and correspond on the abscissa scales to the minimum points on the abscissa scales of Figs. 2 and 3. The calibration error varies in Fig. 4 most rapidly at these points, but varies very slowly at intermediate points. Therefore, if by some means the microwave instrument can be made to function at all times at one of these intermediate points, then variation of the calibration constant would have been eliminated.

This invention provides such means, varying the PRF when altitude is changing so as to maintain operation near a point half way between two altitude holes at all times. At a selected PRF such an altitude point would be represented, for example, by the reference numeral 14, Fig. 4, approximately half way between the first and second order altitude holes identified by the numerals 1 and 2.

Figure 6:
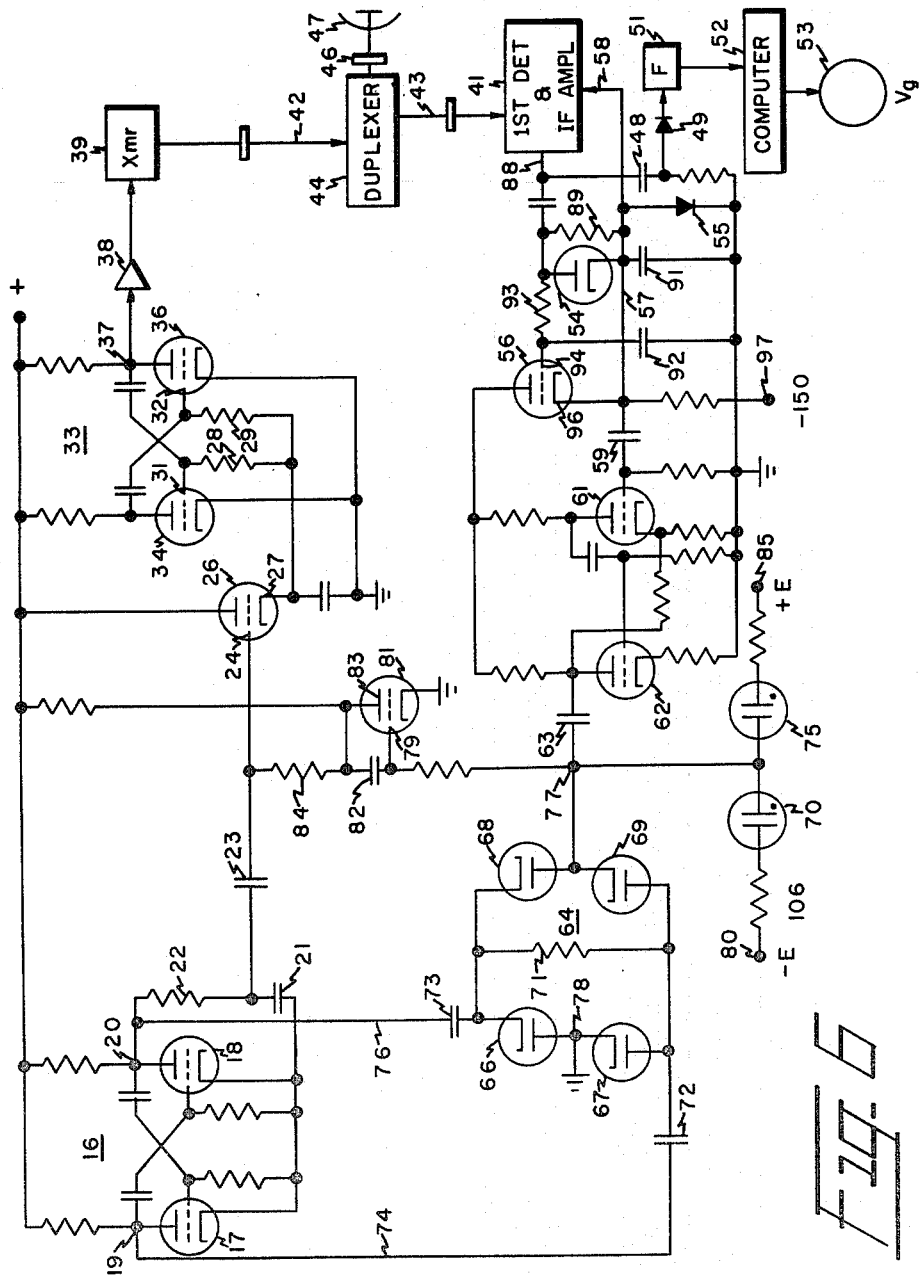
Figure 6 is a schematic circuit diagram of an embodiment of the invention.

The circuit for accomplishing this result is shown schematically in Fig. 6. An oscillator 16 consists of a multivibrator employing two triode tubes 17 and 18. The constants of this multivibrator are such that it emits a rectangular output waveform having a frequency of 10 cycles per second, outputs of opposed phase being available at the anode terminals 19 and 20. The frequency of this output must not be so high as to interfere with the lowest Doppler frequency anticipated and must not be so low as to interfere with beam switches, which may operate at about one cycle per second. Moreover, it cannot be higher than the reciprocal of the time constant of the microwave intermediate frequency automatic gain control circuit since this frequency must be transmitted through the AGC circuit. These considerations limit the frequency of oscillator 16 as a practical matter assuming average conditions, but not theoretically, to a range of 5 to 400 cycles per second.

The square wave output of oscillator 16 is integrated by capacitor 21 and resistor 22 to a triangular output form. The purpose of this triangular waveform is to cause the PRF to be distributed uniformly in time between the limits of its deviation. This triangular output is coupled through capacitor 23 to the control grid 24 of a cathode follower triode 26. The cathode 27 thereof is connected through grid resistors 28 and 29 to the control grids 31 and 32 of a pulse repetition frequency multivibrator generator 33 comprising triodes 34 and 36. The generator 33 emits rectangular pulses of the character demanded by the design of the microwave transmitter, the frequency band being higher than the Doppler frequency band. The output is taken from anode terminal 37, is amplified in amplifier 38, and is applied to microwave transmitter 39.

The microwave transmitter 39 and the first detector and intermediate frequency (IF) amplifier 41 of the microwave receiver are connected through waveguides 42 and 43, duplex circuit 44 and waveguide 46 to a microwave radiator 47. The intermediate frequency amplifier output is coupled through capacitor 48 to a second detector 49 which demodulates the intermediate frequency signal and derives a Doppler frequency signal therefrom. This output is filtered in filter-frequency tracker 51 and applied to a computer 52 in which a signal representative of ground speed is derived and is applied to an indicator 53 displaying its value.

The intermediate frequency output of amplifier 41 is also applied to an automatic gain control circuit comprising a diode 54 and a triode 56. Here the IF signal is again demodulated, amplified and the resulting direct current signal at the AGC bus 57 is applied in the usual manner through conductor 58 to bias the amplifier grids and thereby control the gain so that the IF amplifier output is nearly constant and, for the purposes of computer 52, is independent of fluctuations in the input signal strength which occurs at the frequency of the oscillator 16. Diode 55 restricts the potential on bus 57 to negative polarity.

The small alternating signal component at the frequency of oscillator 16 remaining on AGC bus 57 is additionally employed for the purposes of this invention. The AGC signal is coupled through a capacitor 59, removing its direct current component, to a two-stage amplifier comprising triodes 61 and 62 which are designed to pass the frequency of the oscillator 16. The amplifier output is coupled through a capacitor 63 to a phase detector 64 comprising diodes 66, 67, 68 and 69 and a resistor 71. This detector is phased by being connected through capacitors 72 and 73 and conductors 74 and 76 to the output terminals 19 and 20 of the oscillator 16.

The phase detector 64 operates by short circuiting the input terminal junction 77 to the ground terminal 78 during one half of each cycle. At other times the terminal 77 is free of phase detector control and attains the peak-to-peak potential applied to it through capacitor 63, constituting an interrupted direct potential having a polarity representing the phase of the fluctuations in strength of the received signal which occur at the frequency of the oscillator 16. Resistor 71 discharges capacitors 72 and 73 symmetrically during the grounded half cycle.

Two limit reset neon tubes, 70 and 75, are connected to the junction 77 and to two potential terminals 80 and 85 to switch operation at the limits of voltage range.

The output at junction 77 thus consists of pulsed direct potential of either positive or negative polarity and having a magnitude which may have any value between zero and the maximum permitted. This direct potential is applied to the grid 79 of a direct coupled triode 81 and also through a Miller capacitor 82 to its anode 83. Triode 81 thus both amplifies and at the same time smoothes the signal to its average value. This smoothed signal is applied through resistor 84 to the grid 24 of cathode follower 26. Since grid 24 also receives the alternating potential output of oscillator 16, the direct and alternating potentials are added in their effect in the cathode follower 26, and through it are applied in additive relation to the PRF generator 33.

In the operation of the circuit of Fig. 6 the output of oscillator 16 frequency modulates the PRF generator 33. Let it be supposed that an intermediate output frequency of the PRF generator 33 is 30 kc.p.s., and that its frequency modulation is over a range of about ±3%, or between 29 and 31 kc.p.s., the rate at which this variation takes place being 10 cycles per second. Let it further be supposed that the aircraft is at an altitude of 17,000 feet and that in Fig. 3 operation is at a point 86 one-fourth of the way from the first order PRF hole, 1, to the second order hole, 2.

The microwave transmitter 39, Fig. 6, may operate, for example, at a microwave frequency of 10,000 megacycles per second. It is pulsed or pulse modulated at the above rate of 30 kc.p.s. which is, in turn frequency modulated at a rate of 10 c.p.s. This transmitter output passes through the duplexing circuit 44 to the antenna 47 and is radiated. Echo energy is received by antenna 47 at a slightly different microwave frequency due to Doppler effect, this difference being termed the Doppler frequency difference. The received microwave signal is passed through the duplexer 44 to the first portion of the receiver 41 including a first detector, an intermediate frequency amplifier and apparatus for developing the Doppler frequency. The intermediate frequency amplifier output at conductor 88 is coupled through capacitor 48 to the diode 49 which schematically represents the demodulating circuit necessary for deriving the Doppler frequency signal. This signal is filtered and its mean frequency is found and tracked by a frequency tracker in filter-frequency tracker 51, the output being applied to a computer 52 and ground speed indicator 53.

Figure 3 indicates that the frequency modulation of the pulse repetition frequency varies the echo signal strength. This 10 c.p.s. variation is present in the received signal amplitude at the output of duplexer 44, Fig. 6, and is applied to the intermediate frequency amplifier 41 through waveguide 43. The gain of amplifier 41 is controlled by an automatic gain control circuit, to be described below, so that the level of the 10 c.p.s. variations in output signal strength is low enough so as not to affect adversely the derivation of the ground speed ($V_g$) signal. However, enough of the 10 c.p.s. variation remains to permit its recovery and utilization for other purposes.

The automatic gain control circuit comprising diode 54 and triode 56 secures its input signal from conductor 88 and has two output connections from its output bus 57, one at conductor 58 and the other at capacitor 59. In the operation of this circuit the intermediate frequency signal is developed across resistor 89, capacitors 91 and 92 constituting bypasses for the intermediate frequency but not for the 10 c.p.s. frequency. The input signal is shunt demodulated by diode 54, applying a negative direct-current signal containing a slight amount of 10 c.p.s. signal through resistor 93 to the grid 94 of triode 56. This triode has high 10-cycle gain by virtue of the fact that the input return conductor 57 is connected to its cathode 96 and in addition is effectively a Miller integrator because of the connection of capacitor 92 to its grid 94. However, the presence of capacitor 91 causes the intermediate frequency signal to be applied to triode 56 between its grid 94 and its negative potential terminal 97, so that the triode behaves as a cathode follower for this frequency and does not amplify the IF signal potential. The AGC circuit thus applies only a highly amplified direct-current signal containing an amplified 10 c.p.s. signal to capacitor 59.

The amplifier comprising triodes 61 and 62 is designed for a frequency transmission band including the 10 c.p.s. frequency but excluding direct current. It thus applies the 10 c.p.s. alternating potential, but not the AGC direct current, to junction 77. This results as before mentioned in the application of a direct potential to grid 24 of cathode follower 26, representing by its level and sense the amplitude and phase of the 10 c.p.s. signal applied from capacitor 63 to junction 77. Zero amplitude of this signal produces zero or ground bias of grid 79 and results in a selected positive direct current level at anode 83 and grid 24.

Returning to Fig. 3, when the aircraft is at constant altitude and the circuit of Fig. 6 so operates as to produce a return signal strength level represented by point 86, Fig. 3, the circuit of the invention causes the operating point to move from point 86 toward point 98. The 10 c.p.s. signal applied to junction 77, Fig. 6, is of large magnitude because the slope of the curve of Fig. 3 is maximum at point 86. The phase of the alternating signal at junction 77, Fig. 6 is such that the resulting direct current departure from norm applied to grid 24 and through the cathode follower 26 to control the PRF generator 33 has such direction as to increase the pulse repetition frequency. That is, in Fig. 3 because the PRF increases, the operating point 86 moves upward. As it does so, representing signal strength increase, the signal strength fluctuation range decreases because the slope of the curve decreases. As the exact crest the fluctuation has a mean of zero, resulting in zero or ground bias on grid 79, Fig. 6. However, the operating point stops short of the exact crest, so that the amplified error signal constitutes the requisite direct-current bias addition at the PRF generator to maintain its frequency at the required augmented value.

Figure 7:
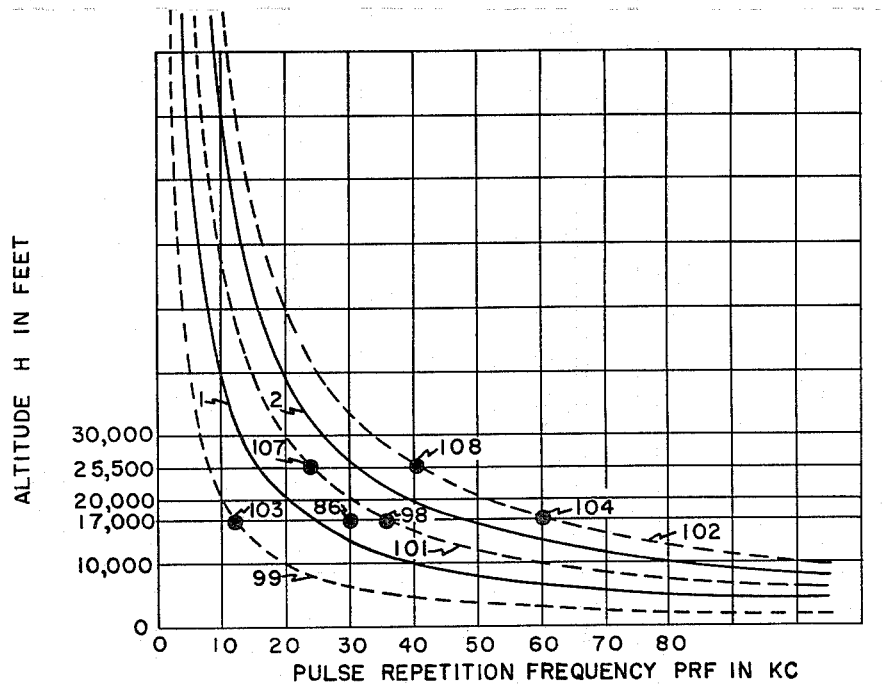

This action can also be followed by use of the design curves of Fig. 7. These curves are equilateral hyperbolas plotted from Equation 4 or 5 by substituting different values of $n$. Curve 1, Fig. 7, corresponds to a value for $n$ of 1 and represents the interrelation of H and PRF at the first order altitude/PRF hole. Similarly curve 2 represents the interrelation at the second order hole. The intermediate dashed curves 99, 101, and 102 represent the interrelations of H and PRF at maximum signal amplitude points, corresponding in the special case of Fig. 3 to the maximum graph points 103, 98 and 104 respectively.

Point 86, Fig. 7, corresponds to point 86 of Fig. 3 and the selected altitude is 17,000 feet. By operation of the circuit of Fig. 6, moving the operating point nearly to 98, Fig. 7, at the same altitude, the PRF is increased from 30 to 35 kc.p.s. This point corresponds to point 98 in both Figs. 3 and 2. It is to be understood throughout that although point 98 is shown in Figs. 2, 3 and 7 exactly at the maximum amplitude point, actually the operating point is removed from this maximum to produce an error signal which, amplified, constitutes the requisite PRF generator bias.

If now the aircraft should change altitude, corresponding to movement of the operating point 98, Fig. 2, on the curve, operation of the circuit will change the PRF continuously so as to maintain operation very near the peaks of curves similar to those of Figs. 2 and 3. This corresponds, in Fig. 7, to movement of the operating point substantially along the curve 101. If, for example, the aircraft should climb, the operating point would be moved from point 98 along curve 101 toward the left as the PRF is progressively diminished to maintain operation almost precisely between the first and second order holes.

Thus this invention accomplishes its primary purpose of maintaining the calibration constant without error. It also accomplishes a secondary purpose of maintaining approximately maximum signal strength.

In accordance with the curves of Fig. 7, and as so far described, the invention would require a variation of pulse repetition frequency from zero to infinity to control the altitude hole effect at all altitudes. In order to secure complete control at all altitudes but with a reasonably limited range of pulse frequencies, the gas diodes 70 and 75, Fig. 6, are provided. In normal operation these diodes remain non-conductive. Zero error signal at junction 77 corresponds to a selected voltage bias at the grids 31 and 32 of the PRF generator 33, at which bias the generator output frequency is near the middle of its range, $f_m$. Increasing positive error voltage causes decreasing PRF generator bias level with resulting decreasing output frequency and, conversely, increasing negative error voltage causes increasing pulse repetition frequency. Now let it be assumed that, starting at a pulse repetition frequency of $f_m$ and an error voltage of zero, the aircraft starts climbing. This increases the error voltage in the positive direction in direct proportion to the difference between $f_m$ and the corrected pulse repetition frequency. An error voltage of zero at junction 77 added to the negative voltage of $-E$ on terminal 80 is not enough to fire diode 70, but as the positive error voltage increases, at its limit, when the pulse repetition frequency has reached its lower limit, diode 70 fires, discharging junction 77 to a negative potential and causing the PRF generator to emit a corresponding increased output frequency. This jump in pulse repetition frequency is of the order of the distances between maximums in Fig. 3, and causes a jump from operation at maximum 98 to operation in the vicinity of maximum 104. During the next grounded half cycle of phase detector 64 the current through resistor 106 causes such voltage drop that gas diode 70 is restored to its nonconductive condition.

Continued aircraft climb thus causes operation to jump from one altitude hole maximum to the next so that with a limited frequency PRF generator an almost limitless range of compensation is secured. When the aircraft dives the opposite action occurs by action of the gas diode 75 and positive potential $+E$ at terminal 85.

This action may be best understood by reference to Fig. 7. Starting at 17,000 feet altitude with PRF at 35 kc. and operation at point 98, let it be supposed that the aircraft climbs to an altitude of 25,500 feet, when PRF=23 kc. corresponding to point 107. At this time diode 70, Fig. 6, fires and operation is instantly transferred to the vicinity of point 108, on curve 102, representing the maximum curve intermediate the second and third order altitude/PRF hole curves. If the aircraft should now descend, operation would follow curve 102 to point 104, at 17,000′ altitude and a pulse repetition frequency of 60 kc. At this point diode 75, Fig. 6, would discharge, causing the point of operation to jump to the vicinity of point 98, Fig. 7.

What is claimed is:

1. A Doppler echo instrument comprising, a frequency modulated pulse repetition frequency generator, a transmitter pulsed thereby and transmitting pulse signals toward a selected target area, a receiver receiving echo signals reflected from said target area, said receiver including an automatic gain control circuit, means for deriving an alternating voltage from said automatic gain control circuit which is a function of the amplitude of said reflected signal over the range through which the pulse repetition frequency of said transmitted signal is varied, means for deriving a direct voltage from said alternating voltage, and means for controlling the frequency of said pulse repetition frequency generator by said direct voltage.

2. A Doppler echo instrument comprising, a frequency modulated pulse repetition generator, a transmitter pulsed thereby and transmitting pulse signals toward a selected target area, a receiver receiving echo signals reflected from said target area, an automatic gain control circuit actuated by signals derived from said receiver and producing therefrom a direct potential varying at the excursion rate of the frequency modulation of said pulse repetition generator, said direct potential having a variation in magnitude dependent on the variation in amplitude of the reflected echo signal over the range through which the pulse repetition frequency of said transmitted signal is varied, means deriving a direct current from said direct potential variation, and means controlling the frequency of said pulse repetition frequency generator by said direct current.

3. A pulsed echo instrument having its pulse modulation continuously and automatically maintained at a frequency which minimizes range calibration error comprising, a frequency-modulated pulse repetition frequency generator, a transmitter pulsed thereby, a target at a selected range, a receiver receiving target echoes of the signals transmitted by said transmitter, said echoes having an amplitude and calibration error which are functions of both the pulse repetition frequency and of said range, said two functions having maxima and minima at the same values of the pulse repetition frequency and range, an automatic gain control circuit actuated by said receiver and emitting a direct potential containing a cyclical potential variation at the frequency modulation excursion rate of said generator, means deriving a smoothed and amplified direct potential from said cyclical potential variation representative of the variation amplitude and having polarity representative of the phase thereof, and means controlling the frequency of said pulse repetition frequency generator in accordance with the amplitude of said last named direct potential.

4. An aircraft pulsed microwave echo instrument having its pulse modulation continuously and automatically maintained at a frequency which minimizes altitude calibration error comprising, an oscillator, a pulse repetition frequency generator having its frequency modulated thereby, a microwave transmitter pulsed by said pulse generator, a target, a microwave receiver receiving target echoes of the signals transmitted by said transmitter, said echoes having amplitudes and calibration errors both of which are damped periodic functions of both pulse repetition frequency and of the slant range of said target, said two functions having maxima and minima at the same values of the pulse repetition frequency and altitude, an automatic gain control circuit actuated by said receiver and emitting a direct potential containing a cyclical potential variation at the frequency of said oscillator, means deriving a smoothed and amplified direct potential from said cyclical potential variation proportional to said cyclical potential variation amplitude and having polarity representative of the phase thereof, and means controlling the frequency of said pulse repetition frequency generator in accordance with the amplitude of said last named direct potential.

5. An aircraft microwave echo instrument having its pulse modulation continuously and automatically maintained at a frequency which minimizes altitude calibration error comprising, an oscillator, a pulse repetition frequency generator having its frequency modulated thereby, a microwave transmitter pulsed by said pulse generator, a ground target, a microwave receiver receiving ground target echoes of the transmissions of said transmitter, said echoes having amplitudes and calibration errors both of which are direct damped periodic functions of the altitude of said aircraft above said target and which are inverse damped periodic functions of the frequency of said pulse repetition frequency generator, said two functions having maxima and minima at substantially the same values of the pulse repetition frequency and altitude, an automatic gain control circuit actuated by said receiver and emitting a direct potential containing potential alternations at the frequency of said oscillator, means isolating said potential alternations from said direct potential, a phase detector deriving a direct potential from said alternating potential representative of the potential thereof and having a polarity representative of the phase thereof, a smoothing amplifier actuated by said phase detector and producing a direct potential, and means controlling the frequency of said pulse repetition frequency generator by said last mentioned direct potential, whereby return signal strength is maintained at a maximum and altitude hole error at a minimum.

6. An instrument in accordance with claim 5 including voltage-sensitive means to produce an abrupt reverse change in pulse repetition frequency when said pulse repetition frequency generator reaches a limit of its frequency range.

References Cited in the file of this patent

UNITED STATES PATENTS

| | | |
|---|---|---|
| 2,415,094 | Hansen | Feb. 4, 1947 |
| 2,415,095 | Varian et al. | Feb. 4, 1947 |
| 2,580,560 | Larsen | Jan. 1, 1952 |